United States Patent
Casazza et al.

(10) Patent No.: US 9,819,237 B2
(45) Date of Patent: Nov. 14, 2017

(54) LARGE-DIAMETER ROTARY ELECTRIC MACHINE ROTOR, AND ROTARY ELECTRIC MACHINE

(71) Applicant: WINDFIN B.V., Leimuiden (NL)

(72) Inventors: Matteo Casazza, Val di Vizze (IT); Paolo Bustreo, Bolzano (IT); Mattia Scuotto, Vipiteno (IT)

(73) Assignee: WINDFIN B.V., Leimuiden (NL)

( * ) Notice: Subject to any disclaimer, the term of this patent is extended or adjusted under 35 U.S.C. 154(b) by 405 days.

(21) Appl. No.: 14/417,071

(22) PCT Filed: Jul. 25, 2013

(86) PCT No.: PCT/IB2013/056119
§ 371 (c)(1),
(2) Date: Jan. 23, 2015

(87) PCT Pub. No.: WO2014/016804
PCT Pub. Date: Jan. 30, 2014

(65) Prior Publication Data
US 2015/0214799 A1    Jul. 30, 2015

(30) Foreign Application Priority Data

Jul. 25, 2012  (IT) .............................. MI2012A1303

(51) Int. Cl.
*H02K 1/30*    (2006.01)
*F03D 9/00*    (2016.01)
(Continued)

(52) U.S. Cl.
CPC ............... *H02K 1/30* (2013.01); *F03D 9/25* (2016.05); *H02K 1/32* (2013.01); *H02K 7/1838* (2013.01);
(Continued)

(58) Field of Classification Search
CPC ................................. H02K 1/30; F03B 13/12
(Continued)

(56) References Cited

U.S. PATENT DOCUMENTS 1,043,047 A    10/1912    Goldschmidt
3,334,411 A *   8/1967    Lindstrom ............... H02K 1/30
                                                          29/467
(Continued)

FOREIGN PATENT DOCUMENTS

DE    129894 C    1/1901
DE    364809 C    12/1922
(Continued)

OTHER PUBLICATIONS

Machine Translation, Iizuka, JP 57078336 A, May 17, 1982.*
(Continued)

*Primary Examiner* — Thomas Truong
(74) *Attorney, Agent, or Firm* — Neal, Gerber & Eisenberg LLP (57) ABSTRACT

A rotor of a wind turbine large-diameter rotary electric machine has a hub configured to rotate about an axis of rotation; a tubular structure extending about the hub and supporting a plurality of active segments arranged about the axis of rotation; and a radial structure configured to connect the hub to the tubular structure, which is divided into a plurality of sectors connectable selectively to the radial structure.

18 Claims, 6 Drawing Sheets

(51) Int. Cl.
*F03D 9/25* (2016.01)
*H02K 1/32* (2006.01)
*H02K 7/18* (2006.01)

(52) U.S. Cl.
CPC ........ *H02K 2213/12* (2013.01); *Y02E 10/725* (2013.01)

(58) Field of Classification Search
USPC .......... 310/216.113, 216.053, 420; 29/42, 53
IPC ....................................................... H02K 1/30
See application file for complete search history.

(56) References Cited

U.S. PATENT DOCUMENTS

| | | | | |
|---|---|---|---|---|
| 5,091,668 | A * | 2/1992 | Cuenot | H02K 1/2773 310/156.61 |
| 2003/0048020 | A1 * | 3/2003 | Tornquist | H02K 1/30 310/179 |
| 2009/0218900 | A1 | 9/2009 | Dickes | |
| 2010/0277028 | A1 | 11/2010 | Alexander et al. | |
| 2011/0266811 | A1 | 11/2011 | Smadja | |
| 2011/0266909 | A1 | 11/2011 | Lokhandwalla et al. | |
| 2011/0278994 | A1 * | 11/2011 | Kuwahara | H02K 1/30 310/422 |

FOREIGN PATENT DOCUMENTS

| | | | |
|---|---|---|---|
| DE | 767611 C | 1/1953 | |
| DE | 102009025929 A1 | 12/2010 | |
| EP | 1641101 A1 | 3/2006 | |
| EP | 1988282 A2 | 11/2008 | |
| GB | 1484967 A | 9/1977 | |
| JP | 55346608 A | 4/1978 | |
| JP | 57078336 A * | 5/1982 | ............... H02K 1/30 |
| WO | WO 02/099950 A1 | 12/2002 | |
| WO | WO 2006/032969 A2 | 3/2006 | |

OTHER PUBLICATIONS

Machine Translation, Ito et al., JP 53-046608, Apr. 26, 1978.*
International Search Report and Written Opinion for International Application No. PCT/IB2013/056119 dated Feb. 6, 2014.
Notification of Transmittal of the International Preliminary Report on Patentablitty (Form PCT/IPEA/416) for International Application No. PCT/IB2013/056119 dated Aug. 22, 2014, and International Preliminary Report on Patentability (Form PCT/IPEA/409) for International Application No. PCT/IB2013/056119 dated Aug. 22, 2014.

* cited by examiner

LARGE-DIAMETER ROTARY ELECTRIC MACHINE ROTOR, AND ROTARY ELECTRIC MACHINE

PRIORITY CLAIM

This application is a national stage application of PCT/IB2013/056119, filed on Jul. 25, 2013, which claims the benefit of and priority to Italian Patent Application No. MI2012A 001303, filed on Jul. 25, 2012, the entire contents of which are each incorporated by reference herein.

BACKGROUND

Electric energy is known to be produced using direct-drive wind turbines (i.e., the type comprising a blade assembly on which the wind blows, and a rotary electric machine comprising a rotor connected directly to the blade assembly). In this type of wind turbine, the rotary electric machine rotor rotates at the same (i.e., relatively slow) speed as the blade assembly, and the wind turbine has the advantages of not requiring a transmission between the blade assembly and the rotor, and of being relatively cheaper to produce and maintain.

This design, however, calls for large-diameter electric machines, especially in the case of permanent-magnet rotary electric machines, which call for a large plurality of poles to compensate for the relative slow rotation speed of the blade assembly.

Moreover, the need for high-power wind turbines significantly affects the size of the rotary electric machines.

The trend is therefore towards increasing the diameter of wind turbine rotary electric machines. Electric machines used on wind turbines, however, must have specific characteristics: they must be relatively lightweight and relatively easy to access for maintenance, and their component parts must be relatively easy to assemble, disassemble and transport at both the first-time installation and repair stages.

One type of rotor described in PCT Patent Application No. WO 2002/099950 comprises a hub designed to rotate about an axis of rotation; a tubular structure extending about the hub and designed to support a plurality of active segments arranged about the axis of rotation; and a spider-type radial structure for connecting the hub to the tubular structure. Though apparently extremely lightweight, this type of rotor is not relatively easy to assemble, and is extremely complicated to maintain.

U.S. Published Patent Application No. 2011/266909 discloses a wind turbine rotor tubular structure made of several sectors each for supporting active segments, whereas EP Patent No. 1,988,282 discloses a wind turbine stator tubular structure made of several sectors each for supporting active members.

The tubular structure is thus relatively easier to assemble, at both the first-time installation and maintenance stages.

This characteristic enables the sectors to be extracted and inserted axially.

SUMMARY

The present disclosure relates to a large-diameter rotary electric machine rotor.

More specifically, the present disclosure relates to a large-diameter rotary electric machine rotor for a wind turbine.

One advantage of the present disclosure is to provide a large-diameter rotary electric machine rotor which is relatively lightweight, permits relatively easy component part replacement, and is relatively easy to produce.

According to the present disclosure, there is provided a large-diameter rotary electric machine rotor for a wind turbine; the rotor comprising:
a hub configured to rotate about an axis of rotation;
a tubular structure extending about the hub and supporting a plurality of active segments arranged about the axis of rotation; and
a radial structure configured to connect the hub to the tubular structure;
wherein the tubular structure is divided into a plurality of sectors connectable selectively to the radial structure independently of the other sectors; wherein each sector is connectable to the radial structure to slide in a direction parallel to the axis of rotation.

In the present disclosure, the tubular structure is segmented (i.e., divided into a plurality of small sectors or modules that can be produced relatively cheaply and relatively easily in the desired form).

The tubular structure is thus relatively easier to assemble, at both the first-time installation and maintenance stages.

This characteristic enables the sectors to be extracted and inserted axially.

In certain embodiments of the present disclosure, the radial structure comprises a plurality of connecting members configured to support the sectors on the radial structure.

In the present disclosure, each sector is fitted to the radial structure using dedicated connecting members. In other words, the tubular structure is a modular structure in which each sector can be removed from the radial structure and replaced with a new sector.

In certain embodiments, each connecting member of the radial structure is located between two adjacent sectors. And the connecting members advantageously do not interrupt the continuity of the tubular structure.

In certain embodiments of the present disclosure, each sector is supported by two angularly spaced connecting members, to provide relatively stable support for the sector.

In certain embodiments, each sector has an axially constant cross section. This characteristic makes the sectors relatively easy to construct. And appropriately shaping the axially constant cross section makes the sectors highly functional.

In certain embodiments, each sector has at least one axial seat configured to house an active segment. The active segments can be slid axially into and out of the respective seats, thus enabling each active segment to be changed relatively easily.

In certain embodiments, each axial seat is defined by two facing ribs extending substantially radially. The ribs serve to hold the active segment in position, in certain embodiments using a form-fit joint and by slightly compressing the active segment.

In certain embodiments, each sector comprises at least one opening extending axially. This embodiment makes it possible to circulate cooling gas or liquid inside the sector.

In certain embodiments, each sector comprises two axial guides configured to form an axially sliding joint with the radial structure.

The axially constant cross section structure of the sectors enables the sectors to be extruded.

More specifically, a bar is produced with a constant cross section shaped to define the seat ribs, the openings and the guides; and the bar is then cut to the required length.

Alternatively, each sector is made of stacked laminations of the same shape. In this case, the technique used is the same as for constructing electric machine magnetic guides. Sectors made from laminations have the advantage of reducing heat loss.

In certain embodiments of the present disclosure, the radial structure comprises a plurality of spokes, each extending from the hub and joined at its free end to a connecting member connectable to a sector.

The hub and the radial structure define the supporting structure of the rotor and the sectors.

In certain embodiments of the present disclosure, the spokes, the connecting members and the hub are formed in one piece. This embodiment has the advantage of enabling the whole supporting structure of the rotor to be cast, for example, from aluminium.

Alternatively, the spokes are fitted to the hub. The advantage of this embodiment lies in the modular design or configuration and relatively easy transport of the rotor.

In certain embodiments, each spoke is substantially straight and oriented substantially radially, whereas the connecting member is oriented axially.

The connecting members of the radial structure are aligned axially to form an axially sliding joint with the sectors.

It should be appreciated that the spokes may be made of different shapes to combine structural rigidity of the rotor and light weight.

In one embodiment, each spoke is V-shaped, and each connecting member comprises two separate, axially aligned portions.

In another embodiment, each spoke is Y-shaped, and each connecting member comprises two separate, axially aligned portions.

In an alternative embodiment of the present disclosure, the radial structure comprises a plurality of tie spokes configured to connect the hub to the tubular structure. This embodiment produces a relatively extremely lightweight rotor that can be assembled on site.

The present disclosure also relates to a large-diameter rotary electric machine.

According to the present disclosure, there is provided a large-diameter rotary electric machine configured for installation on a wind turbine configured to produce electric energy; the rotary electric machine comprising a stator and a rotor coupled magnetically, and wherein the rotor is formed in accordance with any one of the characteristics described.

Additional features and advantages are described in, and will be apparent from the following Detailed Description and the figures.

BRIEF DESCRIPTION OF THE DRAWINGS

A plurality of non-limiting embodiments of the present disclosure will be described by way of example with reference to the attached drawings, in which.

DETAILED DESCRIPTION

Figure 1:
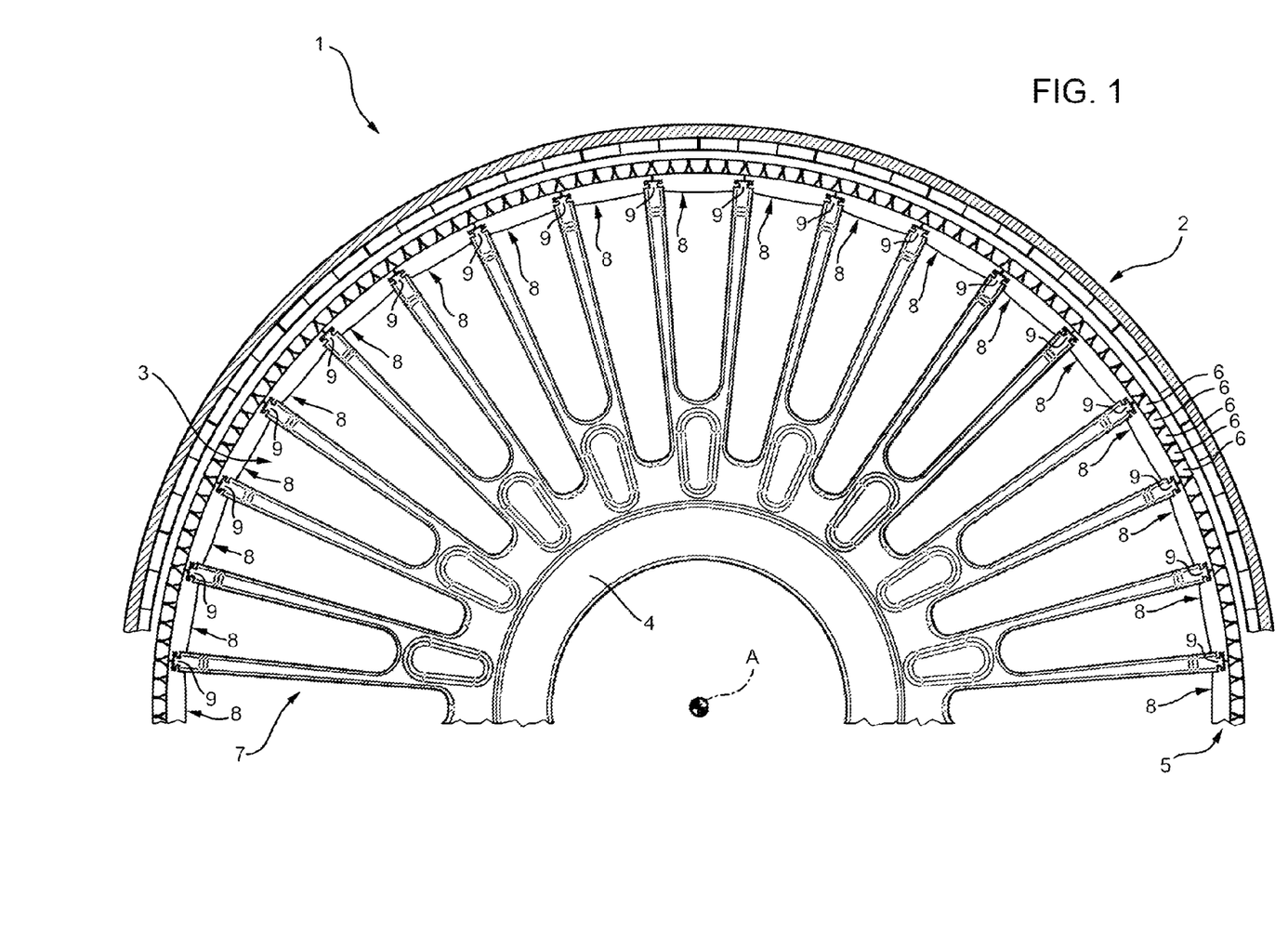
FIG. 1 shows a schematic side view, with parts removed for clarity, of a rotary electric machine in accordance with the present disclosure.

Referring now to the example embodiments of the present disclosure illustrated in FIGS. 1 to 10, number 1 in FIG. 1 indicates as a whole a large-diameter rotary electric machine configured for installation on a wind turbine (not shown in the drawings).

Rotary electric machine 1 comprises an annular stator 2 extending about an axis of rotation A; and a rotor 3, which extends about axis of rotation A, and is mounted to rotate about axis of rotation A with respect to stator 2. In the example shown, rotor 3 is located inside stator 2, but the present disclosure also applies to applications in which the rotor surrounds the stator.

Rotor 3 comprises a hub 4 configured to rotate about axis of rotation A; a tubular structure 5 extending about hub 4 and configured to support a plurality of active segments 6 arranged about axis of rotation A; and a radial structure 7 configured to connect hub 4 to tubular structure 5.

Tubular structure 5 comprises a plurality of sectors 8 connectable selectively to radial structure 7 (i.e., each sector 8 defines an angular sector of tubular structure 5). In other words, tubular structure 5 is defined by an endless succession of adjacent sectors 8 fitted to radial structure 7. In certain embodiments, sectors 8 are the same size and equally spaced about axis of rotation A.

Radial structure 7 comprises a plurality of connecting members 9 configured to connect radial structure 7 to sectors 8. Connecting members 9 are located along the outside diameter of radial structure 7 and equally spaced about axis of rotation A. More specifically, each connecting member 9 of radial structure 7 is located between two sectors 8.

In the example shown, each sector 8 is fitted to two angularly spaced connecting members 9.

Each sector 8 is connectable to radial structure 7 to slide axially (i.e., in a direction parallel to axis of rotation A).

Figure 2:
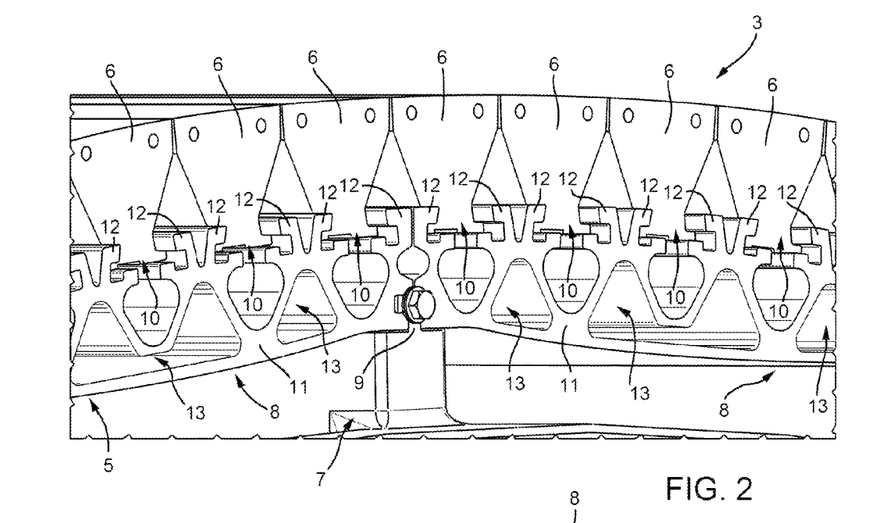
FIG. 2 shows a larger-scale view in perspective, with parts removed for clarity, of the rotor of the FIG. 1 rotary electric machine.

With reference to FIG. 2, each sector 8 has an axially constant cross section. That is, each sector 8 of this embodiment comprises a rectangular-sector-shaped main body 11.

More specifically, each sector 8 is configured to fit to radial structure 7 and to support a plurality of active segments 6. For this purpose, each sector 8 has a plurality of axial seats 10 configured to house active segments 6. Each seat 10 is configured to house an active segment 6, and comprises two facing ribs 12 extending axially and projecting substantially radially with respect to main body 11.

Each active segment 6 is defined by a prismatic assembly comprising permanent magnets and magnetic guides. Each active segment 6 and each two facing ribs 12 are configured to form an axially prismatic joint by which to fit and remove active segment 6 to and from sector 8.

Ribs 12 are configured to flex circumferentially to grip, and at the same time selectively permit axial slide of, active segments 6.

Each sector 8 comprises at least one through opening 13 extending axially and formed in main body 11. In certain embodiments, each sector 8 comprises a plurality of openings 13 extending axially and formed in main body 11. Openings 13 are relatively large, and serve to form a trellis-like cross section of sector 8 to achieve a high degree of resistance to deformation combined with light weight. Openings 13 also provide for circulating cooling liquid or gas.

Figure 3:
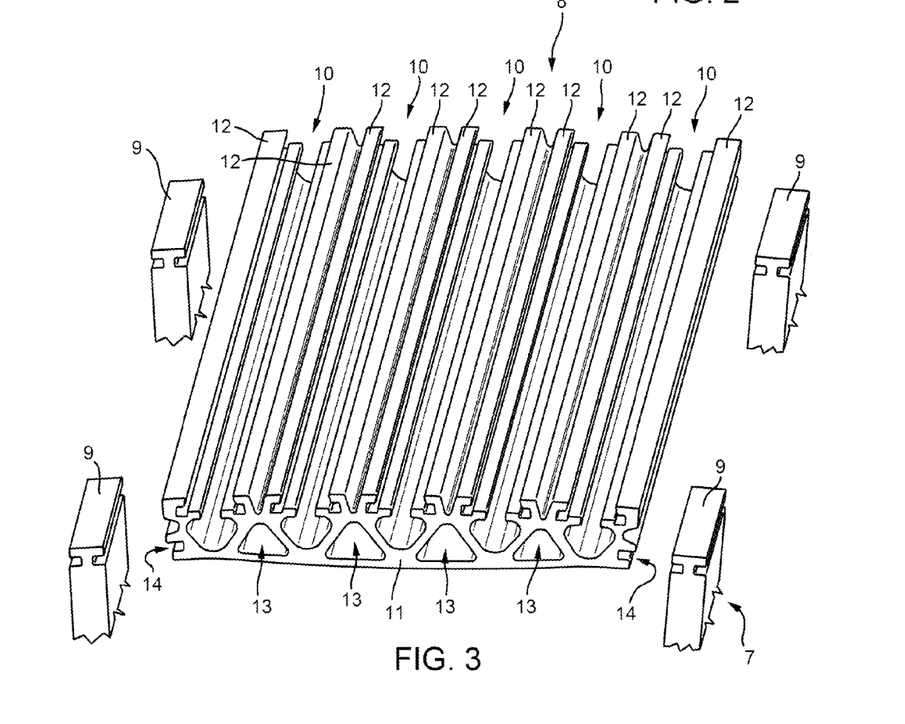
FIG. 3 shows a partly exploded, smaller-scale view in perspective, with parts removed for clarity, of a variation of the sector of the rotor according to the present disclosure.

FIG. 3 shows a variation of the FIG. 2 sector 8. In FIG. 3, any parts identical or similar to those in FIG. 2 are indicated using the same reference numbers. As shown more clearly in FIG. 3, each sector 8 comprises two axial guides 14 configured to form an axially sliding joint with radial structure 7. In the example shown, each guide 14 is defined by an axial groove configured to fit prismatically to a portion of a connecting member 9.

With reference to FIG. 2, sectors 8 are locked in position with respect to radial structure 7 by fasteners, such as bolts, engaging radial structure 7, and more specifically connecting members 9.

In certain embodiments, each sector 8 is extruded from aluminium. That is, a bar of appropriate cross section is extruded and cut into sectors.

Figure 4:
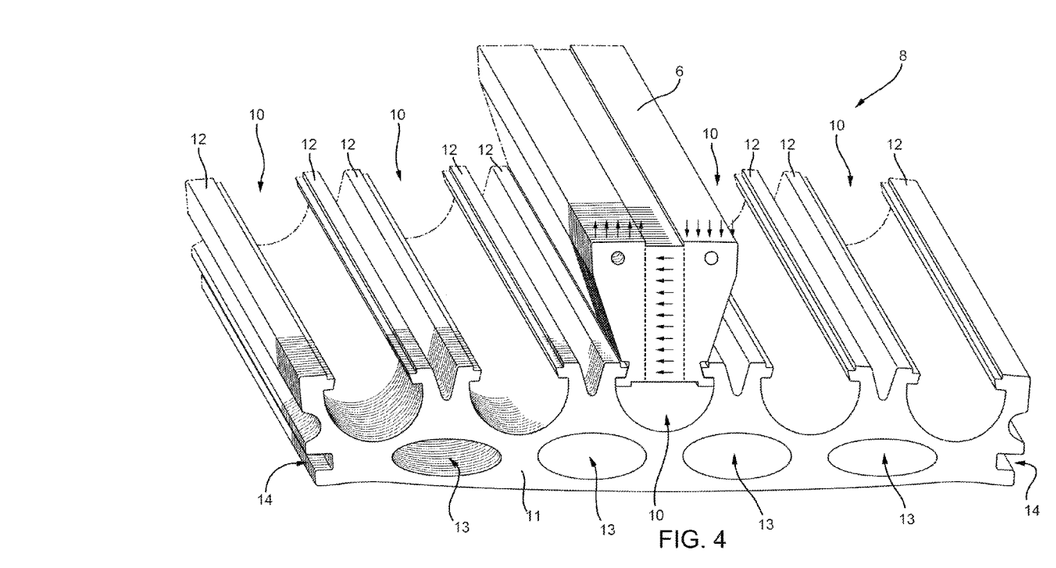
FIG. 4 shows a larger-scale view in perspective, with parts removed for clarity, of another variation of the sector of the rotor according to the present disclosure.

FIG. 4 shows another variation of sector 8, with a different cross section from those in FIGS. 2 and 3. As opposed to being extruded from aluminium, each sector 8 may be made from stacks of identical ferromagnetic laminations secured by traction bars (not shown in the drawings).

Figure 5:
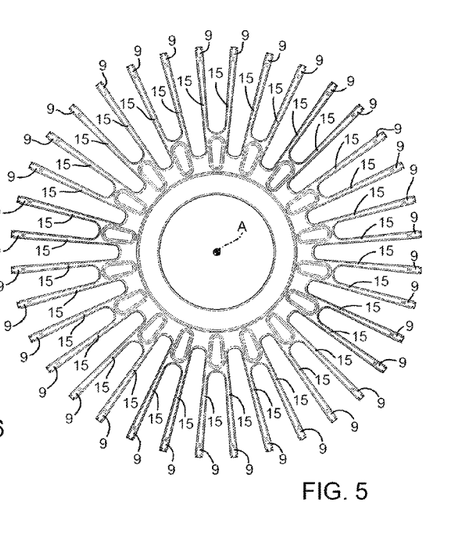
FIG. 5 shows a side view, with parts removed for clarity, of a component part of the rotor according to the present disclosure.

With reference to FIG. 5, radial structure 7 comprises a plurality of spokes 15, each extending from hub 4 and having a connecting member 9 on its free end.

Hub 4, spokes 15, and connecting members 9 are, in certain embodiments, formed in one piece, and, in certain of these embodiments, cast from aluminium alloy. Spokes 15 extend radially with respect to axis of rotation A, and are configured to be self-supporting (i.e., each spoke 15 is configured to withstand in-service bending, tensile and compressive stress).

Figure 6:
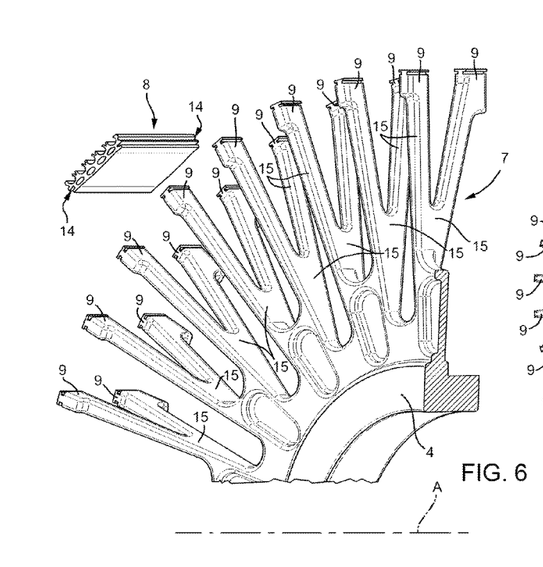
FIG. 6 shows a partly sectioned, larger-scale view in perspective, with parts removed for clarity, of the FIG. 5 component part and a sector.

With reference to FIG. 6, each connecting member 9 is oriented axially.

In the FIG. 6 example, each spoke 15 is V-shaped, and each connecting member 9 comprises two separate, axially aligned portions. With reference to FIG. 3, each connecting member 9 is a section oriented axially and configured to fit prismatically to guides 14 of sectors 8.

Figure 7:
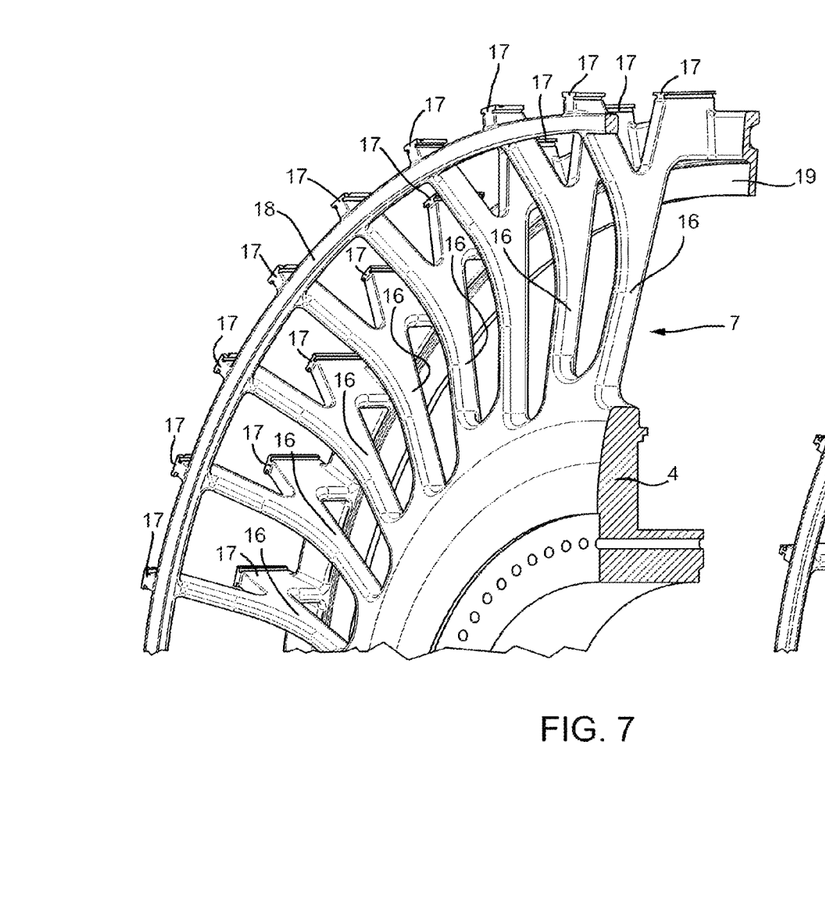
FIGS. 7 and 8 show partly sectioned, larger-scale views in perspective, with parts removed for clarity, of respective variations of the FIG. 5 component part.

In the FIG. 7 variation, radial structure 7 comprises Y-shaped radial spokes 16; connecting members 17, each having two separate, axially aligned portions; an emergency bearing 18; and a brake disk 19.

Figure 8:
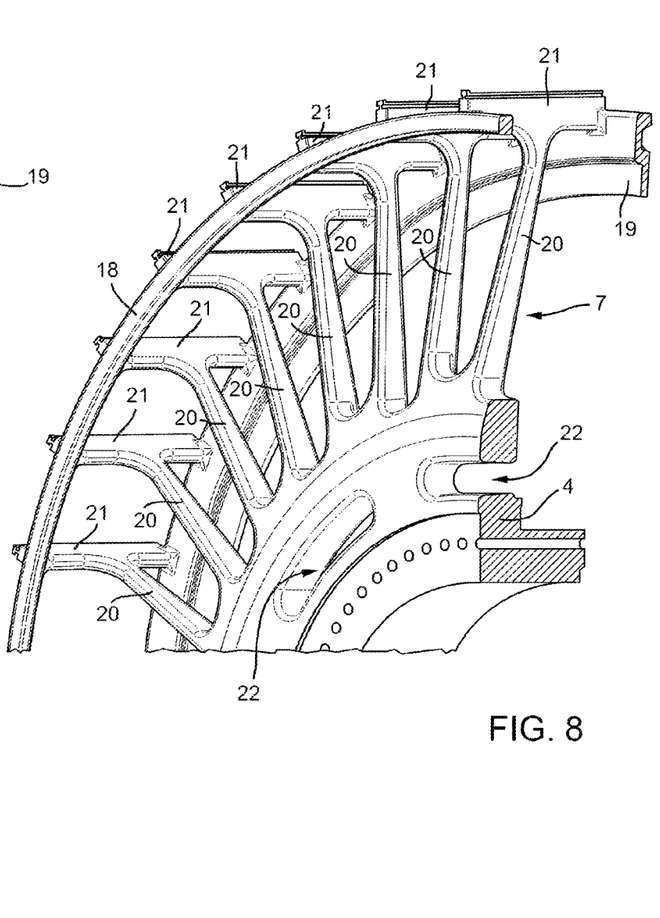

In the FIG. 8 variation, radial structure 7 comprises straight radial spokes 20; connecting members 20, each having one axial portion; an emergency bearing 18; a brake disk 19; and weight-reducing openings 22 a hub 4.

Figure 9:
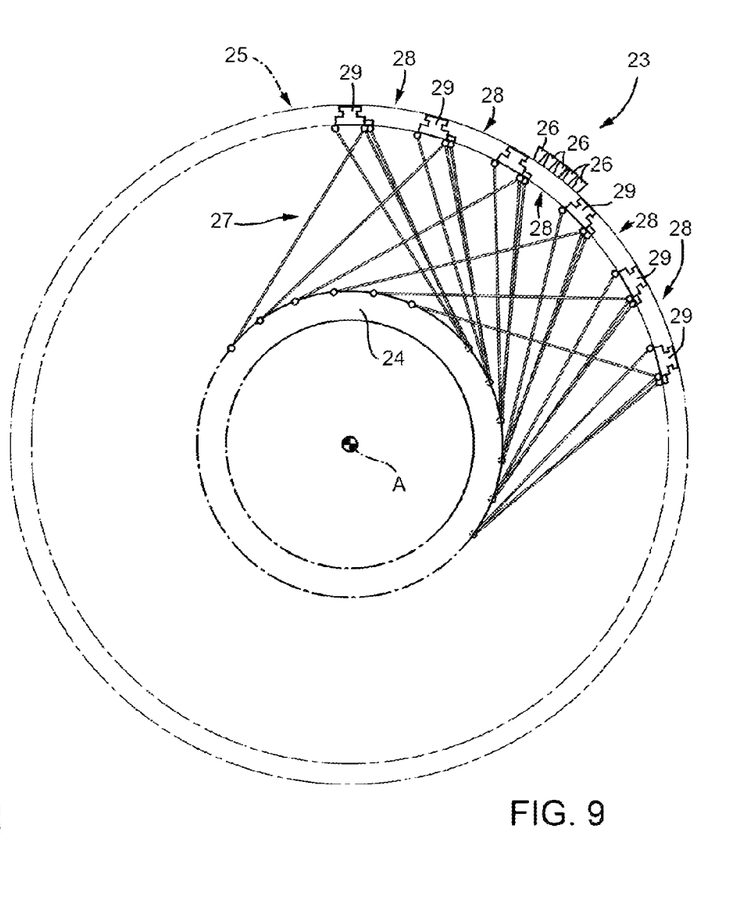
FIG. 9 shows a schematic side view, with parts removed for clarity, of an alternative embodiment of the rotor according to the present disclosure.

Number 23 in FIG. 9 indicates a rotor comprising a hub 24; a tubular structure 25 configured to support active segments 26; and a radial structure 27 configured to connect hub 24 to tubular structure 25. Tubular structure 25 comprises a plurality of sectors 28 equally spaced about axis of rotation A. Radial structure 27 comprises a plurality of axial connecting members 29; and a plurality of tie spokes 30 configured to support connecting members 29. Tie spokes 30 are arranged in two circles along hub 24 and in two circles along tubular structure 25, as shown more clearly in FIG. 10. Sectors 28 and active segments 26 are similar or identical to those shown and described with reference to the preceding drawings.

Figure 10:
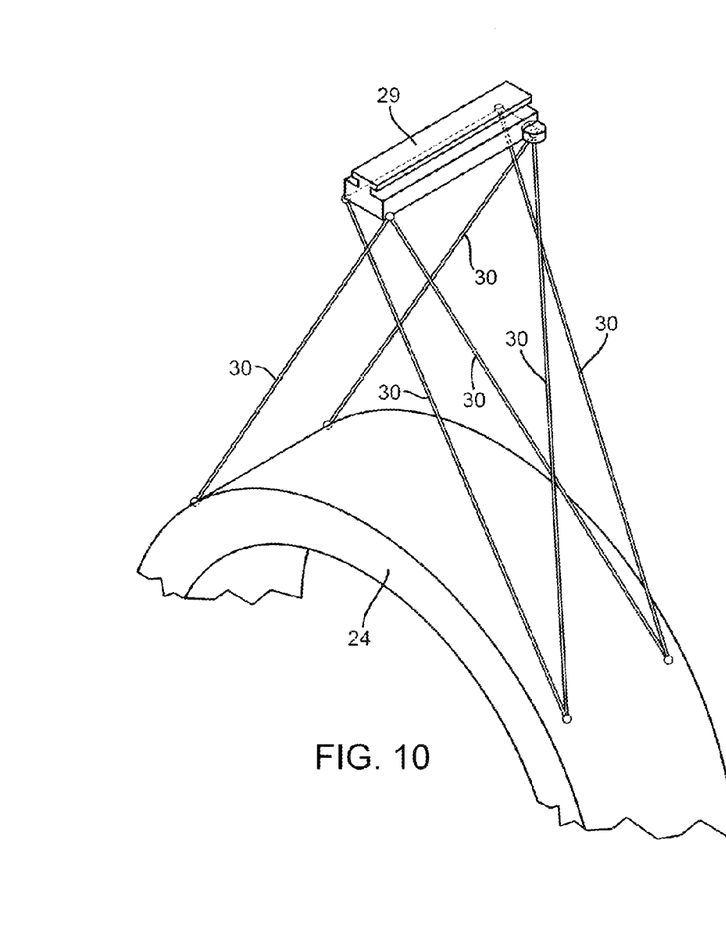
FIG. 10 shows a partly sectioned, larger-scale view in perspective, with parts removed for clarity, of the FIG. 9 rotor.

With reference to FIG. 10, each connecting member 29 is a bar section oriented axially, and is connected to tubular structure 25 by a plurality of tie spokes 30 arranged in pairs. In the FIG. 10 example, each connecting member is supported by three pairs of tie spokes 30. Two pairs of tie spokes 30 converge circumferentially, and one pair of tie spokes 30 cross axially to support connecting member 29 even without sectors 28.

Tie spokes 30 are mainly configured to withstand tensile stress, and are adjustable in length using nipples (not shown in the drawings). Once all the sectors 28 are positioned, tie spokes 30 can be adjusted in length to support tubular structure 25 at the appropriate circumferential compression, and to adjust the roundness of tubular structure 25.

Clearly, changes may be made to the rotor according to the present disclosure without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind turbine rotary electric machine rotor comprising:
    a hub configured to rotate about an axis of rotation;
    a tubular structure extending about the hub and supporting a plurality of active segments arranged about the axis of rotation, said tubular structure being divided into a plurality of sectors, wherein each of the sectors defines at least one axial seat defined by two substantially radially extending facing ribs and configured to house at least one of the active segments including a prismatic assembly of a permanent magnet and a magnetic guide; and
    a radial structure configured to connect the hub to the tubular structure, wherein each of the sectors of the tubular structure is, independent of the other sectors of the tubular structure, selectively connectable to the radial structure, each of the sectors of the tubular structure is axially slideably connectable to the radial structure and each of the sectors defines two axial guides configured to form an axially sliding joint with the radial structure.

2. The wind turbine rotary electric machine rotor of claim 1, wherein the radial structure includes a plurality of connecting members configured to support the plurality of sectors.

3. The wind turbine rotary electric machine rotor of claim 2, wherein each of the connecting members of the radial structure is located between two adjacent sectors of the plurality of sectors.

4. The wind turbine rotary electric machine rotor of claim 2, wherein each of the sectors is supported by two angularly spaced connecting members of the plurality of connecting members.

5. The wind turbine rotary electric machine rotor of claim 1, wherein each of the sectors has an axially constant cross section.

6. The wind turbine rotary electric machine rotor of claim 1, wherein each of the sectors defines at least one axially extending opening.

7. The wind turbine rotary electric machine rotor of claim 1, wherein at least one of the sectors includes an aluminium extruded sector.

8. The wind turbine rotary electric machine rotor of claim 1, wherein at least one of the sectors is made of a plurality of stacked laminations.

9. The wind turbine rotary electric machine rotor of claim 1, wherein the radial structure includes a plurality of spokes, each spoke extending from the hub and each spoke joined at a free end to a connecting member connectable to at least one of the sectors.

10. The wind turbine rotary electric machine rotor of claim 9, wherein the spokes, the connecting member and the hub are formed in one piece.

11. The wind turbine rotary electric machine rotor of claim 9, wherein the spokes are fitted to the hub.

12. The wind turbine rotary electric machine rotor of claim 9, wherein:
each of the plurality of spokes is substantially straight and substantially radially oriented, and
the connecting member is axially oriented.

13. The wind turbine rotary electric machine rotor of claim 9, wherein:
each of the plurality of spokes is V-shaped, and
the connecting member includes two separate, axially aligned portions.

14. The wind turbine rotary electric machine rotor of claim 9, wherein:
each of the plurality of spokes is Y-shaped, and
the connecting member includes two separate, axially aligned portions.

15. The wind turbine rotary electric machine rotor of claim 1, wherein the radial structure includes a plurality of tie spokes configured to connect the hub to the tubular structure.

16. The wind turbine rotary electric machine rotor of claim 1, wherein each of the sectors of the tubular structure is connectable to the radial structure to slide in a direction parallel to the axis of rotation.

17. An electric energy producing wind turbine rotary electric machine comprising:
a stator; and
a rotor magnetically coupled to the stator, said rotor including:
a hub configured to rotate about an axis of rotation;
a tubular structure extending about the hub and supporting a plurality of active segments arranged about the axis of rotation, said tubular structure being divided into a plurality of sectors, wherein each of the sectors defines at least one axial seat defined by two substantially radially extending facing ribs and configured to house at least one of the active segments including a prismatic assembly of a permanent magnet and a magnetic guide; and
a radial structure configured to connect the hub to the tubular structure, wherein each of the sectors of the tubular structure is, independent of the other sectors of the tubular structure, selectively connectable to the radial structure, each of the sectors of the tubular structure is axially slideably connectable to the radial structure, and each of the sectors defines two axial guides configured to form an axially sliding joint with the radial structure.

18. The electric energy producing wind turbine rotary electric machine of claim 17, wherein each of the sectors of the tubular structure is connectable to the radial structure to slide in a direction parallel to the axis of rotation.

* * * * *